Jan. 12, 1954

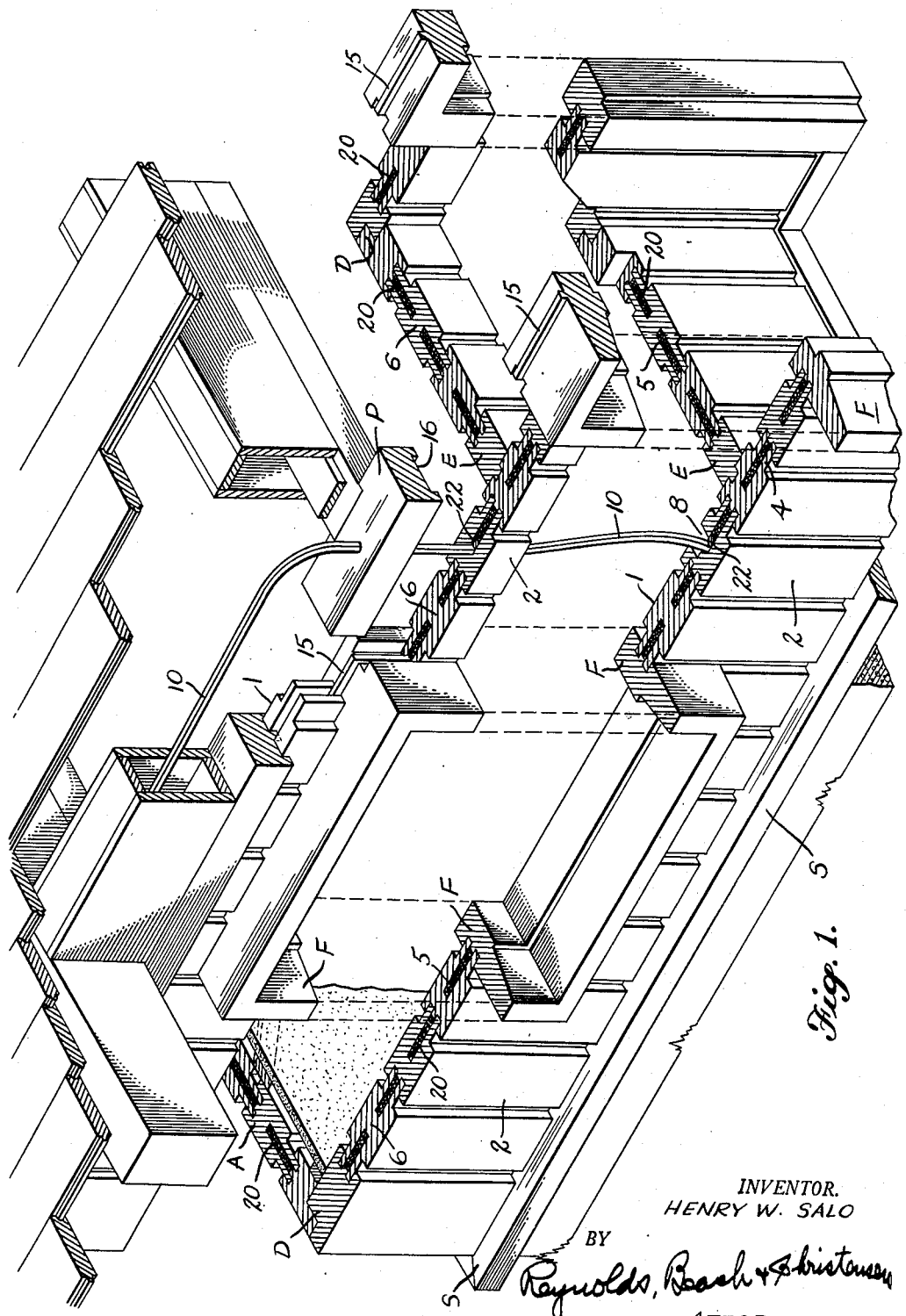

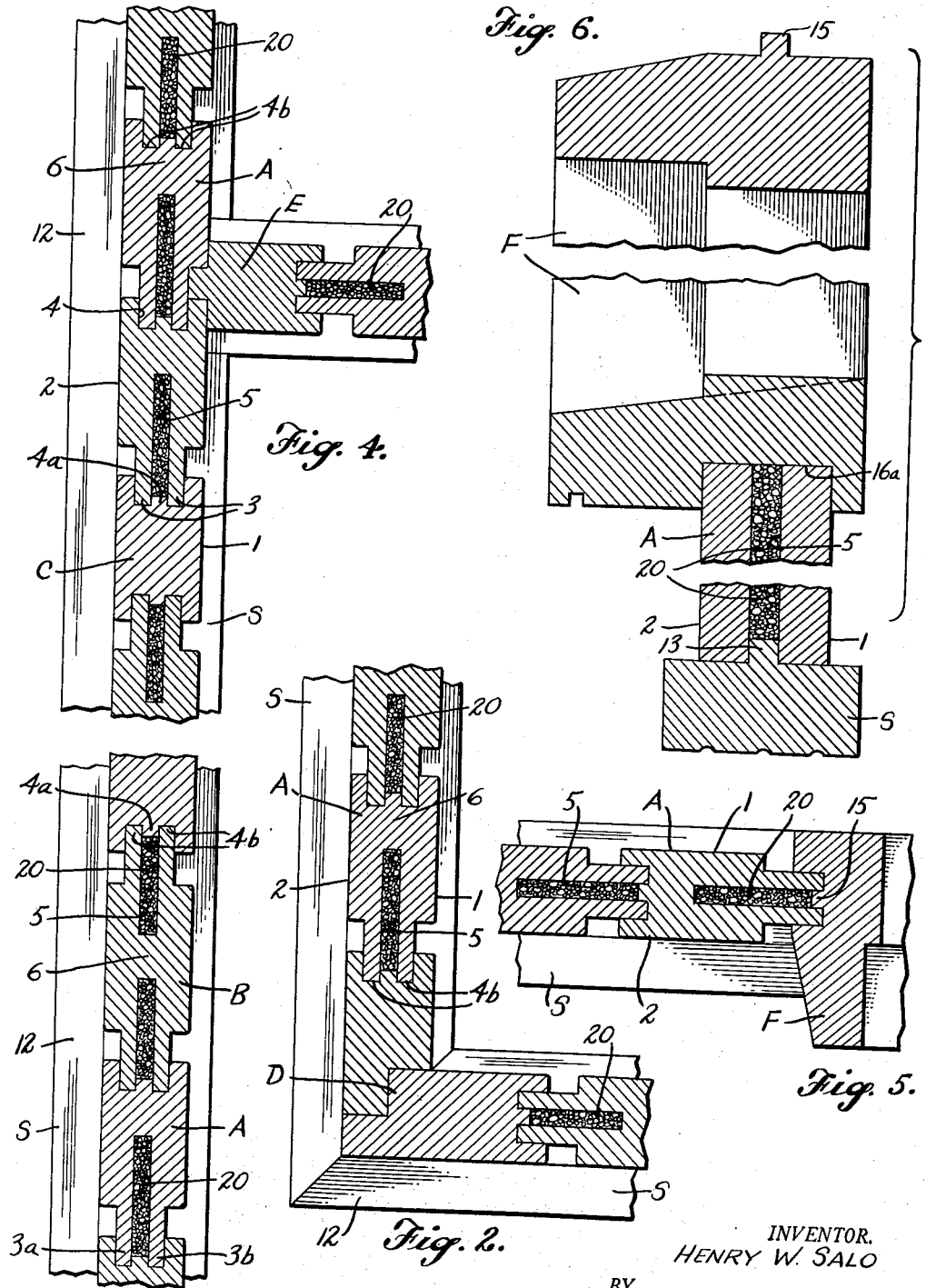

H. W. SALO 2,665,455

STRUCTURAL UNIT AND STRUCTURE

Filed Jan. 9, 1951

INVENTOR.
HENRY W. SALO
BY
Reynolds, Beach & Christensen
ATTORNEYS

Jan. 12, 1954

H. W. SALO 2,665,455

STRUCTURAL UNIT AND STRUCTURE

Filed Jan. 9, 1951

INVENTOR.
Henry W. Salo
BY
Reynolds, Beach + Christensen
ATTORNEYS

Patented Jan. 12, 1954

2,665,455

UNITED STATES PATENT OFFICE 2,665,455

STRUCTURAL UNIT AND STRUCTURE

Henry W. Salo, Seattle, Wash.

Application January 9, 1951, Serial No. 205,157

15 Claims. (Cl. 20—4)

In the Pacific Northwest are many thousands of acres of second-growth fir trees or western red cedar trees, some only ten years old, others twenty, thirty, or forty years old. These grow thickly, crowding out one another. Often their site, originally remote, now lies in the path of expansion of suburban or agricultural development, and because of higher land values and taxes, and the necessity of making profitable use of the land, such trees cannot be permitted to mature as merchantable timber, which requires an age of at least sixty years, and are not large enough to make it economical to saw them up, hence must be felled and burned, or at best must be used to no higher purpose than as firewood, provided labor and transportation costs will permit even such usage.

Early settlers found such smaller trees ideal for the construction of log cabins, but these settlers had the time and were forced by necessity to fit and chink them painstakingly. Moreover, such whole logs were not so prone to crack and check, for these effects are usually the result of alteration of the balance of internal stresses such as is likely to result from milling operations and from uneven drying. If, however, in a settler's log cabin enough logs became rotted from moisture entering their interior through such cracks, it was not too difficult a matter to build a new cabin, for they were not elaborate, and the materials were close at hand, and free for the taking. Besides, pioneer settlers had no concern over wiring their log cabins, nor over installation of plumbing, nor were they overly concerned about appearances.

Log cabins are still appropriate for erection in or near forested or rustic areas, and the small trees are still abundantly available there, but conditions have changed. The intending occupant is no longer able to go out with an axe and saw, and his oxen, to procure his logs. No longer can he spare the time, even had he the strength, the skill, and the will. High labor costs prohibit hiring this done in most cases, and those to whom cost is not a compelling consideration insist on greater comfort—no draughts, adequate wiring, plumbing, roominess, and diversity of rooms and architectural forms—and no longer life—freedom from checking, cracking, rotting, insects, etc.—and less maintenance cost, than can be had in natural logs, or even, heretofore, in milled pseudo log products.

Here then, in the face of a dearth of housing, and in a growing area, where the raw material, namely, second-growth trees, is abundant and cheap, construction continues dependent on mill and retail lumber costs, and on high construction costs, and the raw material is, apparently, wasted. The key to the adequate utilization of this raw material, for use in this region or for shipment and use elsewhere, lies in manufacturing it cheaply into standardized units, requiring only a short time for drying, subject only in minimum degree to cracking and checking, and hence to rotting, easily erected, well adapted to modern wiring and plumbing installations, usable in a variety of architectural forms, and, above all, reliably tight or self-sealing against changing weather or climatic conditions throughout a reasonably long useful life, even when erected before the units are fully dried.

It is to the attainment of the above object that this invention is directed, the immediate objective being the production from such trees of structural elements in a minimum number of standard forms, and mostly of a single basic form, from which wall structures and the like, incorporating door and window frames as and where needed, can be rapidly set up, the forms being such that they are readily constructed by small mills, even of the portable type, which froms will not require any lengthy curing and yet will largely relieve any tendency to crack or check, and which when fitted with other similar units and with the window and door frames in a wall structure can be made automatically self-sealing, without reliance on nails or the like, in most cases, and continue to be self-sealing throughout its useful life, and the latter by the employment of materials which usually will be available cheaply and in quantities in the vicinity of the point of erection of the structure.

More specifically, it is the intent by this invention to provide a plank-like structural unit of standardized or basic design, in whatever external form may be desired, formed along at least one edge (and usually only the one edge) with a tongue and along the other edge with a groove to receive the tongue of an adjoining unit, having a large central cavity which will cut out so much material from the interior of the plank as will relieve internal stresses and facilitate drying out of green timber for use within a short time, and which cavity, in the wall structure, will promote flexibility, and is intended to be filled with a granular self-packing material, such as pebbles or sand, the grains whereof, by their mass, fluidity and outward pressure, originally and throughout the life of the structure, will continue to urge the walls of the cavity outwardly, and particularly will urge the outer faces of the somewhat more flexible tongue against the sides of the groove to maintain the joints tight.

Having in mind such a structural unit of basic or standardized design, it is an object to provide window and door frames which will cooperate therewith in facilitating assembly and keeping all joints tight, and also to provide a minimum number of variant forms of the basic design, such as double-tongued or double-grooved units, and corner units, to produce the desired degree of flexibility and variety of design, with a minimum of on-the-job fitting, hence at minimum expense.

It is, of course, an object to provide such a structural unit, and a wall structure made of a number of such units, which can be easily and quickly put together, is tight throughout, and which will facilitate the employment of electric wiring and modern plumbing through the use of conduits concealed within the walls.

With these objects in mind, and others that will appear shortly, this invention comprises the novel wall structure made up by the use of units of the character described, such as is shown in the accompanying drawings and as will be described in this specification and more particularly defined by the claims which terminate the same.

Figure 1 is an isometric view, broken away in various places, of a possible structure built up of such units, incorporating door and window frames, and including sill, plate, and roof structures: the assembly has been chosen more to illustrate a variety of combinations and relationships than as a whole practical structure.

Figures 2, 3, 4, and 5 are typical horizontal sectional views of individual details, and Figure 6 is a similar vertical sectional detail.

Figure 11:
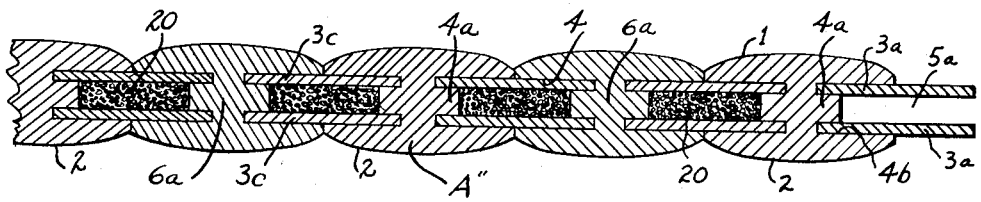
Figure 11 is a similar view of a still further modified form of such units.

Each normal structural unit is conveniently milled to standard size, of uniform cross-section throughout its length, and preferably from a single tree or log of appropriate size, wherefore its heartwood is located approximately in the center of the completed unit. It may be milled from halves or quarters of larger logs, but the principles will be very much the same. Its exterior shape may be any that is desired, and herein (referring to the basic unit, in its several illustrated forms) it is shown as a plank having the generally planar faces 1 and 2, rounded or beveled along their sides to give somewhat the effect of logs. They might be rounded throughout, if desired, to simulate a log even more closely, and such a form is shown in Figure 11. They are preferably installed in upright position, that is, to rest upon one end and extend generally vertically, for in that manner the full strength of the plank is utilized and no framing or reinforcing is required. However, the horizonal assembly shown in Figures 7 and 8 still incorporates the same principles.

The principles which are common to the forms illustrated, and which may be incorporated in other forms, deal the one with the interengagement between adjacent edges of adjoining planks by the use of junction elements, whether separate from or integral with the planks themselves, spaced apart to define an interior cavity; another with the arrangements to afford flexibility to the walls of cavity, and to assist quick drying of the plank with minimum accumulation of stresses, and minimum cracking; and the third with the employment of a filler material in the cavity of somewhat special characteristics, in a manner and to the end of keeping joints always tight by continuing internal, outwardly directed pressure from within such cavity when it is filled with such filler material.

The basic unit A will first be described, and its modified forms A' and A'', after which the several variant forms B, C, D, and E, and the window and door frames F, and the manner in which they all cooperate in the assembly of a wall structure, will be explained. Although but few of the basic units A are illustrated in Figure 1, that figure is chosen more to illustrate the varied forms and possibilities than as representative of an actual structure, and in an actual structure most of the units would be of the basic type A, or A' or A''.

In the basic form of the plank A one edge is of reduced thickness to constitute a tongue 3 which, however, is divided or bifurcated, as will shortly be explained in detail. The opposite edge of the plank or unit is grooved at 4, the groove being of a width such as will snugly receive the tongue 3 of an adjoining unit. The depth of the groove 4 need not be great, just sufficient to insure adequate tightness, provided the tongue 3 continues to fit snugly within its groove. Any excess width of the tongue which will not enter the groove simulates chinking. Preferably each groove 4 has a rib 4a upraised from its bottom, defining subsidiary grooves 4b which receive snugly the edges of the tongue's two halves 3a and 3b.

The groove 4 cuts somewhat into the interior of the original log, and to that extent relieves stresses that might tend to crack the milled log, and facilitates drying by opening the interior to the air. These same results, however, are achieved somewhat more extensively by milling out an interior cavity 5, in the nature of another groove, from the opposite edge of the unit, which cavity is of appreciable depth. Just how deep should be the cavity 5, it is not possible to state mathematically or empirically. Preferably it will extend inwardly from the side edge wherein is formed the tongue 3 a distance greater than the width of the tongue, so that the cavity extends well inward towards the heartwood of the log. If it extends at least halfway through the log, it will include the major portion or all of the heartwood, and as herein shown it can extend to a point close to the bottom of the groove 4, so as to leave a relatively narrow and slightly flexible connecting portion 6 joining the otherwise unconnected side portions 1 and 2. The depth of the cavity 5 will depend on such factors as the greenness or dryness of the wood, the particular kind of wood and its tendency to check or crack, its strength in the connecting portion 6, the degree of flexibility desired therein and in the two faces 1 and 2, and similar factors.

In any event, it is clear that the cavity entering from the side edge wherein the tongue 3 is formed will bifurcate the tongue, and indeed, in the modified unit A' the portion of the cavity which lies within the tongue itself is beveled or curved as indicated at 7, so as to increase somewhat the flexibility of the two furcations of the tongue, in addition to the over-all flexibility afforded by the narrow connecting portion at 6. In this construction the rib 4a is omitted.

Figure 9:
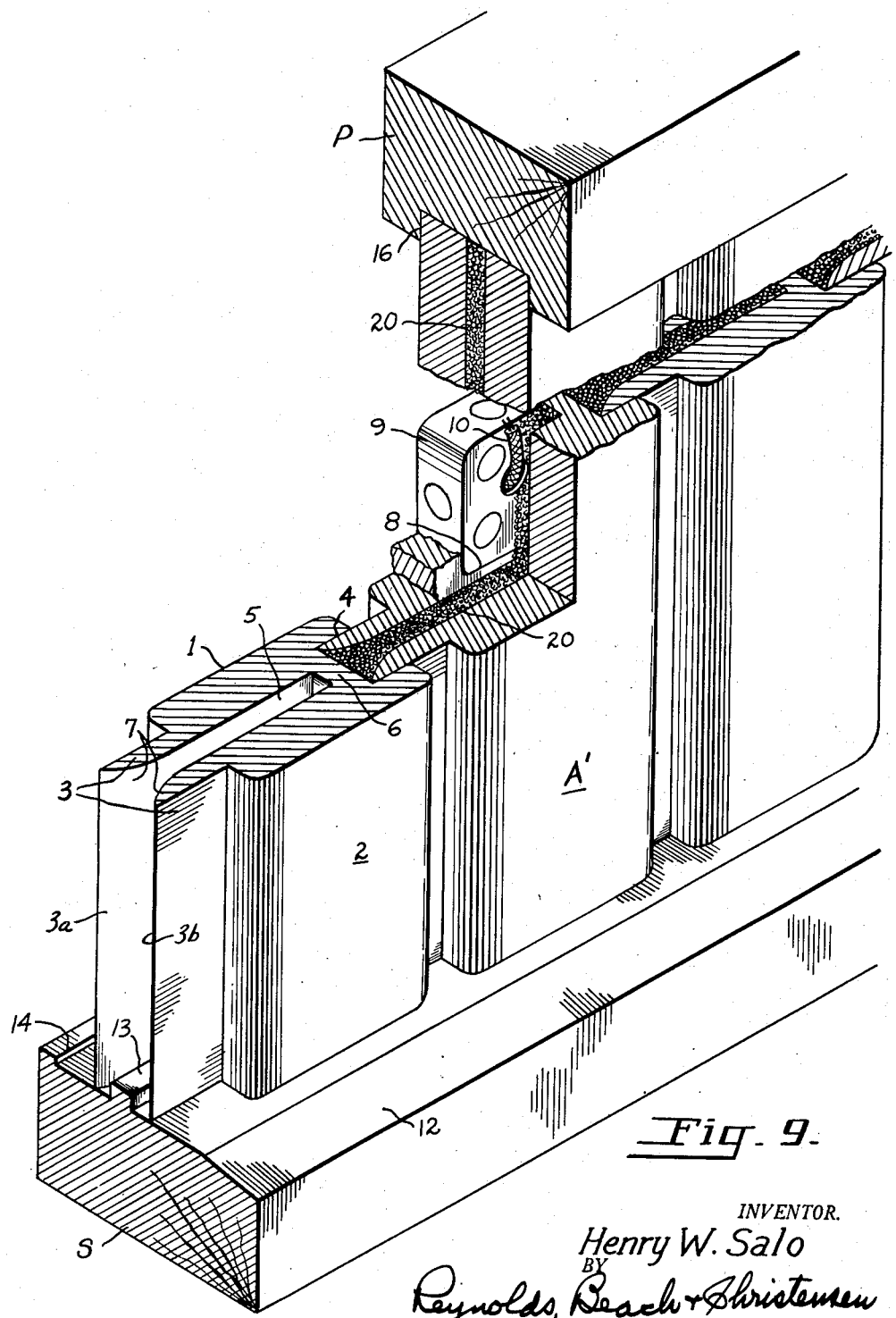
Figure 9 is an isometric view of a wall structure broken away and shown in section in various parts, to illustrate a modified form of the unit and a wall structure embodying the same, to illustrate another manner of using the principles of this invention.
Figure 10:
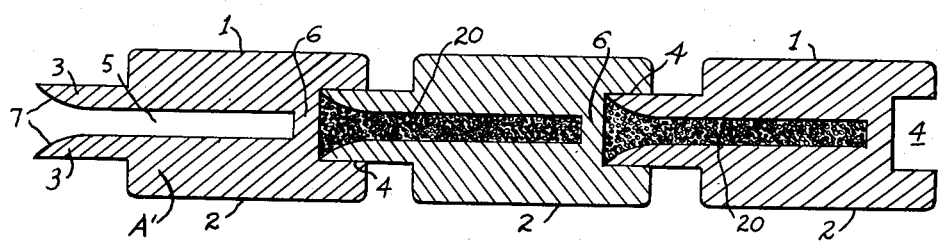
Figure 10 is a cross-sectional view of several such modified units, assembled into a wall structure.

In erecting a wall structure which employs such units, it is convenient to employ a sill piece S, which, in exterior sills, may be sloped on its outer upper surface, as indicated at 12, to constitute a water table, and inwardly from this outer edge it is formed with an upstanding rib 13, extending longitudinally and fitting within a complemental groove cut in the lower end of each structural unit. This interfitting, coupled with the optionally used inside flange 14 (see Figure 9) which engages the inside face 1, serves to locate each structural unit in turn against inward or outward displacement, and any equivalent means to that end may be employed. The means shown, however, will not permit water to run back into nor stand within the interior, and has been found entirely suitable for the purpose, and simple to construct.

Individual structural units are supported uprightly upon such a sill, and each in turn is interfitted along its side edges by inserting the tongue 3 into the groove 4 of the adjoining unit, with the furcations 3a and 3b entered within the grooves 4b, and thus the wall is constructed rapidly, for such units may be six, eight or ten inches in width. No nails or equivalents need be used. At appropriate places apertures 8 (see Figure 9) may be cut into the inside face 1, within which may fit outlet boxes 9 for wires 10, or outlets for plumbing or other utilities. The wires, pipes, or tubing for such utilities extend from the outlet box, or the like, through the cavity 5 downwardly or upwardly to connection with mains below the lower end or above the upper end of these structural units, suitable holes being bored in the sill S, or in a cap piece or plate P, which is grooved at 16 to fit over the upper ends of all units.

Window and door frames F are formed across the lintel and along each stile with outstanding ribs 15 which correspond generally to the ribs 4a of the basic units A, and to the ribs 13 of the sill S, see Figure 6. Each basic unit is of the same effective width as all other such units, hence if each window or door frame is made a multiple of the unit width, there is no other limitation on its size, and it can interfit snugly at each side with the standard basic unit or with modified units shortly to be described. Above such frames, and beneath window frames, short lengths of the same basic or modified units are fitted, and by grooving the window sills at 16a to interfit with the upper ends of short units, just as the longer units fit the grooves 16 of the plate P, a tight joint is secured all around.

Clearly, if the ribs 15 project leftward from the left stile of a frame F, and rightward from the right stile thereof, to interfit in each case with the furcations 3a and 3b, the basic units A at the opposite sides of such frame will face oppositely. Somewhere reversal of the units must occur, wherefore there are provided special double-tongued units B and double-grooved units C, for occasional use as needed. These are generally similar to the basic unit A, and exteriorly are indistinguishable from the latter.

In order to avoid the necessity of on-the-job formation of outside and inside corner units, these are preferably factory-formed, to interfit with the units A, B, or C; two representative units are shown at D and at E. Because it is less practicable to groove them deeply, and such deep grooving is helpful in avoiding cracking or warping of the plank-like standardized units, and permits green timber to be used within a short time after felling, it is preferred that well-seasoned wood be employed for these corner units.

It will be recognized that the cutting of a cavity into the vicinity of or including the heartwood of such a unit facilitates and hastens drying and reduces the probability of cracking, affords some flexibility between the two face portions 1 and 2 of the unit, and provides a space wherein ducts to utility outlets may run. However, this cavity also performs a further function in the present structure, in that it is intended to be filled from the top, before the plate unit is installed, with dry, loose, granular material which is of a self-packing nature, such as wheat gravel, or even coarse sand. If care is taken to seal sand against exit at the utility outlets, as by the use of sealing strips 22, sand is the preferred filler material, for it packs more rapidly and tightly; otherwise, gravel is preferred, for the reason that it will not sift into outlet boxes or small cracks surrounding them. It is the intention that such filler material completely fill each cavity when the structure is set up in wall form, and that it remain there throughout the life of the building. The utility ducts are embedded therein or separated therefrom by the strips 22.

The use of this filler, which is indicated at 20, causes some static fluid-like outward pressure on the walls of the cavity 5, and this effect, acting through the flexibility of the connecting portion at 6, and through the flexibility of the furcations of the tongue, aided perhaps by the reduction at 7 in the thickness of the furcations of the tongue 3 and the resultant increased flexibility there, serves to urge the outer faces of the tongue 3 tightly against the walls of the groove 4. Moreover, this effect persists throughout the life of the structure, for all movement and jarring only serves to settle the fluent filler slightly, to pack the more and to urge the furcations outwardly. While there may be eventually a slight loss of outward pressure at the extreme upper end of each such unit, especially if the filler is gravel, the danger of leakage is least at this point, and there remains adequate outward pressure to maintain the respective tongues tight in their grooves throughout all material portions of the length thereof. Experience has shown that the joints remain tight throughout, notwithstanding wide ranges of temperature and humidity, and not withstanding extremes of these factors at opposite sides or in spaced portions of such walls.

The modified unit A'' shown in Figure 11 utilizes the same general principles, and offers substantially the same advantages, but requires some added work in its assembly. Herein, the ribs 4a and grooves 4b are or can be identical at the two edges of the plank, and the connecting portion 6a is located centrally between the bottoms of these two grooves; as before, it can be as narrow or as wide as the designer may consider necessary. In this form, instead of integral tongue halves 3a and 3b, the equivalent is formed by two junction elements 3c each of which is received partly in the groove 4b of one unit and partly in the facing groove 4b of the adjoining unit. One such junction element 3c seats against the inwardly facing side wall of the two grooves 4, and the other seats against the opposite side wall of the grooves. They may be of plywood, and are of such thickness, relative to the width of the grooves, as to define between them a cavity 5a, wherein filler material 20 is received, to press outwardly the opposite junction elements against the side walls of the groove, in the same manner and to the same end as in the arrangement previously described.

The planks or individual units are best made of wood. They might, of course, be molded of plastic or fibrous material, or the like, but when made of wood, as ordinarily they would be, they are combustible. Nevertheless, the presence of the filler material at 20 serves as a noncombustible wall between the exterior and the interior, which would tend to make the structure as a whole quite fire-resistant. Indeed, if the cavity is burned into, the filler would tend to smother the flames as the filler spills out, especially if the filler is sand.

Figure 7:
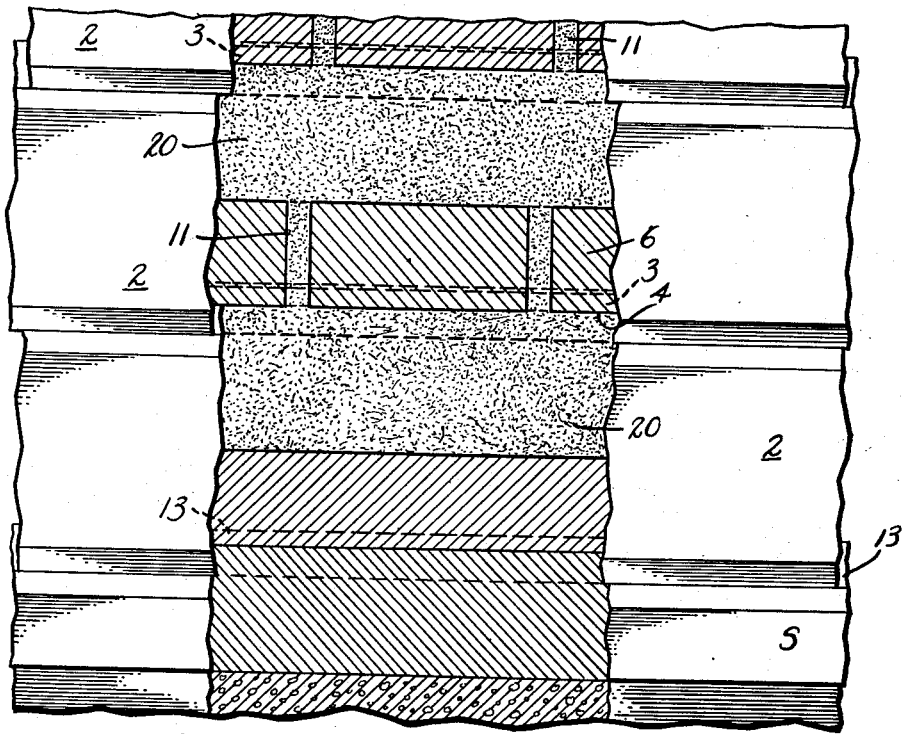
Figure 7 is an elevational view, partly broken away to a central vertical section, illustrating the same structural principle employed with the basic unit disposed horizontally.
Figure 8:
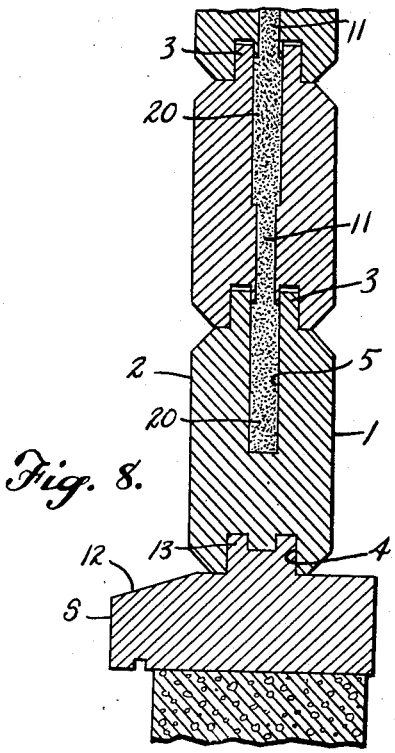
Figure 8 is a transverse vertical sectional view of the same.

While it is preferred that the units be placed uprightly as shown, so that no framing or additional stiffening elements are needed, it is not outside the scope of the invention to place the units horizontally, normally with the grooves 4 down and the tongue 3 up, and such an arrangement as illustrated in Figures 7 and 8. The units need not depart from the forms already described, save that the tongues 3 are preferably shorter, so that each unit rests solidly on the unit beneath, and dependence is not placed upon the tongues for structural strength. The filler material at 20 (usually sand, in this form) may be placed in each cavity 5 as the unit is laid up, but preferably several units are laid up, and then dry sand is poured in the upper cavity; upon jogging the wall such sand will run through holes 11 provided for the purpose, sifting through until all cavities are well filled.

The units would ordinarily be milled soon after being felled in the forest, and the mill required to form them is comparatively simple, portable and inexpensive, so that it can be moved from spot to spot to be near the supply of timber. Units, after being milled, may be laid aside for a brief period to dry, and the cavity 5 and/or grooves 4, which remove a large part of the heartwood and expose the interior to drying air, decrease very materially the time of drying, and assist in preventing the creation of destructive stresses within the wood. After such a period of drying, the units are transported to the job and there (or previously) are cut to lengths and milled at the ends to receive the ribs 13 or 15. There they are set up as indicated, and may be used for exterior walls, for interior partitions, and for all similar wall structures. The dry sand or gravel for the filler is generally available near the building site, and can be poured in after the walls have been set upright.

It is the intention to treat the units prior to erection with sealer after they are reasonably dried, so as to prevent entrance of moisture into the fibers after the structure has been completed and is exposed to the elements. The structure can be painted or otherwise further sealed after erection, as the owner may desire.

While it has not been illustrated how water pipes and the like may be installed, it is evident that their installation would be similar to that of the electric utilities shown at 10, with tubing or pipes extending through the cavities, and connecting laterally by grooves or by extensions above the plate P or below the sill S, or even directly by bores through the connecting portion at 6. All such ducts or leads will be embedded within and held against chafing by the filler material, or separated therefrom by the strips 22.

In Figure 1 are shown details of roof and roof-supporting structures. These illustrate how simply and economically such a structure can be erected, but in themselves are not a part of this invention.

I claim as my invention:

1. A wall structure comprising a plurality of like elongated wooden structural units disposed in parallel, adjoining relationship to define a wall, the majority of said units being generally of H-shape in cross section, to define a cavity entering from one edge, and a groove entering from its opposite edge, separated by a portion connecting the two opposite surface portions, said units being assembled successively with the groove of one opposite the cavitied edge of the adjoining unit, two junction elements projecting from the cavitied edge of the one unit into the groove of the adjoining unit, each with its outwardly directed face seating against one of the inwardly directed faces of such groove, the junction elements being of such thickness relative to the width of the groove as to leave a space between the inwardly directed faces of the junction elements and continuous with the cavity, and a filler of fluent granular material received within such space and bearing against such inwardly directed faces of said junction elements, and the granules of such filler having sufficient unit mass to urge said junction elements mutually outwardly against the inwardly directed faces of the groove wherein they are received, to maintain thereat a tight seal.

2. A wall structure as in claim 1, wherein the groove is formed in one edge only of the majority of such units, and the junction elements are formed integrally with and project from the opposite cavitied edge of each such unit.

3. A wall structure as in claim 1, wherein the junction elements are formed integrally with and project from the cavitied edge of each unit, and the connecting portion between the two surface portions is of a width, in the direction of the unit's width, sufficiently small to flex, under the pressure of the filler material, to urge said junction elements outwardly against the inwardly directed faces of the groove wherein they are received.

4. A wall structure as in claim 1, wherein the filler comprises primarily loose pebbles.

5. A wall structure as in claim 1, wherein each unit is similarly grooved along each edge, characterized in that the junction elements are separate from each unit, span the crack between their edges, and enter and seat against the inwardly directed faces of the groove in each unit, and are pressed thereagainst by the filler material.

6. A wall structure as in claim 1, characterized in that each groove is formed at its bottom with two subsidiary grooves of a width to snugly receive the two junction elements which project from the adjoining units, and an intermediate rib spacing apart such entered junction elements.

7. A wall structure as in claim 1, wherein the groove is milled in one edge only of a majority of such units, and the two junction elements are milled from the same piece of wood as the unit itself, and project, in spaced apart relationship, from the opposite edge of each such unit opposite that wherein the groove is formed.

8. A wall structure as in claim 1, wherein the two junction elements constitute a projecting bifurcated tongue, of an overall thickness to be received within and to seat against the respectively opposite side walls of the groove in the adjoining unit, and each furcation individually of such thickness as to leave a space between their inside faces, in free communication with the cavity, for reception of the filler material.

9. In combination with a wall structure as in claim 1, wherein the surface portion of selected units is recessed from one face inwardly to but not appreciably beyond the cavity, a utility outlet received in and closing each such recess, and leads extending through the cavity to a terminus outside the wall structure.

10. A wall structure as in claim 1, wherein the combined depth of the groove and cavity in each unit is at least half the total width of the unit.

11. A composite wall structure comprising a support directed lengthwise of the wall, a plurality of similar elongated generally upright units each resting at its lower end upon said support, aligning means interengaged between each such end and the support, each unit being formed with an interior cavity extending lengthwise and opening at one edge, of a depth to leave the opposite face portions connected by a connecting portion of a width less than the width of the unit itself, a groove extending lengthwise of that edge of the unit which is opposite that wherein the cavity opens, the cavitied edge being formed of a thickness to be snugly received in such groove of an adjoining unit, and thereby to close the cavity's opening at its open edge, the cavity being closed at the bottom by said support, and a filler of loose granular self-packing material, of unit mass sufficient to produce an outward component, substantially filling the several cavities in the wall structure, and retaining each such unit expanded along its groove-entering edge, against the walls of the groove in the adjoining unit.

12. A composite wall structure as in claim 10, wherein each cavitied edge of a unit is shaped to define a bifurcated tongue, of an over-all thickness to snugly fill the groove in the edge of the adjoining unit, the furcations of the tongue being progressively flexible towards the outer edge of the tongue, for increasing yieldability to the outwardly pressing force of the filler.

13. A composite wall structure as in claim 10, wherein the support is formed with a longitudinally directed upstanding rib, and the lower end of each unit is formed with a transversely directed locating and retaining groove spanning said rib, and retaining the several upright units in a common general plane.

14. A composite wall structure as in claim 11, wherein the several units are milled from unitary planks of wood.

15. A composite wall structure comprising a sill, a plurality of similar upright units each supported at its lower end upon and interengaged with said sill for location thereby and each grooved along one side edge and formed with a longitudinally bifurcated tongue along its opposite side edge for closely interfitting engagement in side by side relation, the furcations of the tongue defining a cavity opening within the groove of the adjacent unit which receives said bifurcated tongue, and a filler of loose granular self-packing material substantially filling the several cavities in the wall structure, and of sufficient unit mass to urge the furcations outwardly against the side walls of the groove wherein they are received.

HENRY W. SALO.

References Cited in the file of this patent

UNITED STATES PATENTS

| Number | Name | Date |
|---|---|---|
| 754,039 | Ball | Mar. 8, 1904 |
| 1,521,933 | Drake | Jan. 6, 1925 |
| 2,208,671 | Gerber | July 23, 1940 |
| 2,380,834 | Goldman | July 31, 1945 |